No. 649,875. Patented May 15, 1900.
H. H. PREDMORE.
COMB CUTTING MACHINE.
(Application filed Dec. 27, 1898.)
(No Model.) 5 Sheets—Sheet 3.
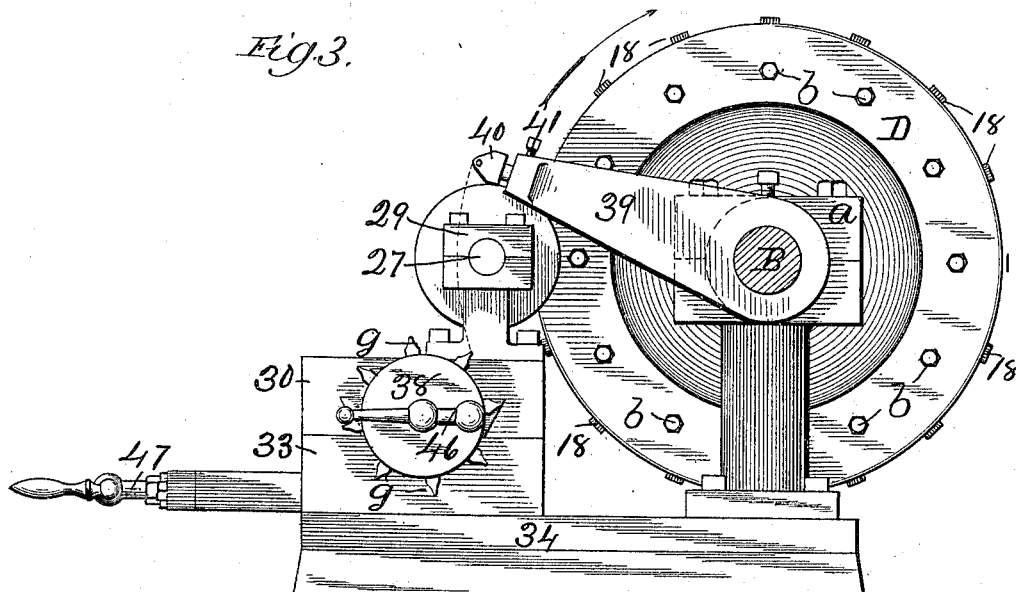
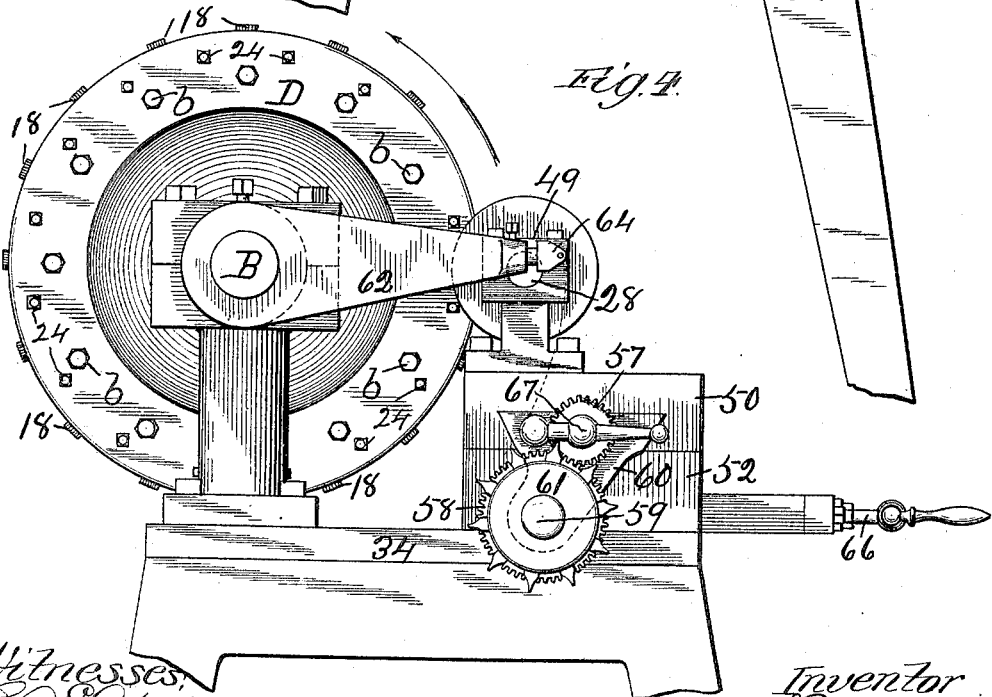
Witnesses: Inventor
H. H. Predmore
By L. B. Coupland & Co.
Attys.

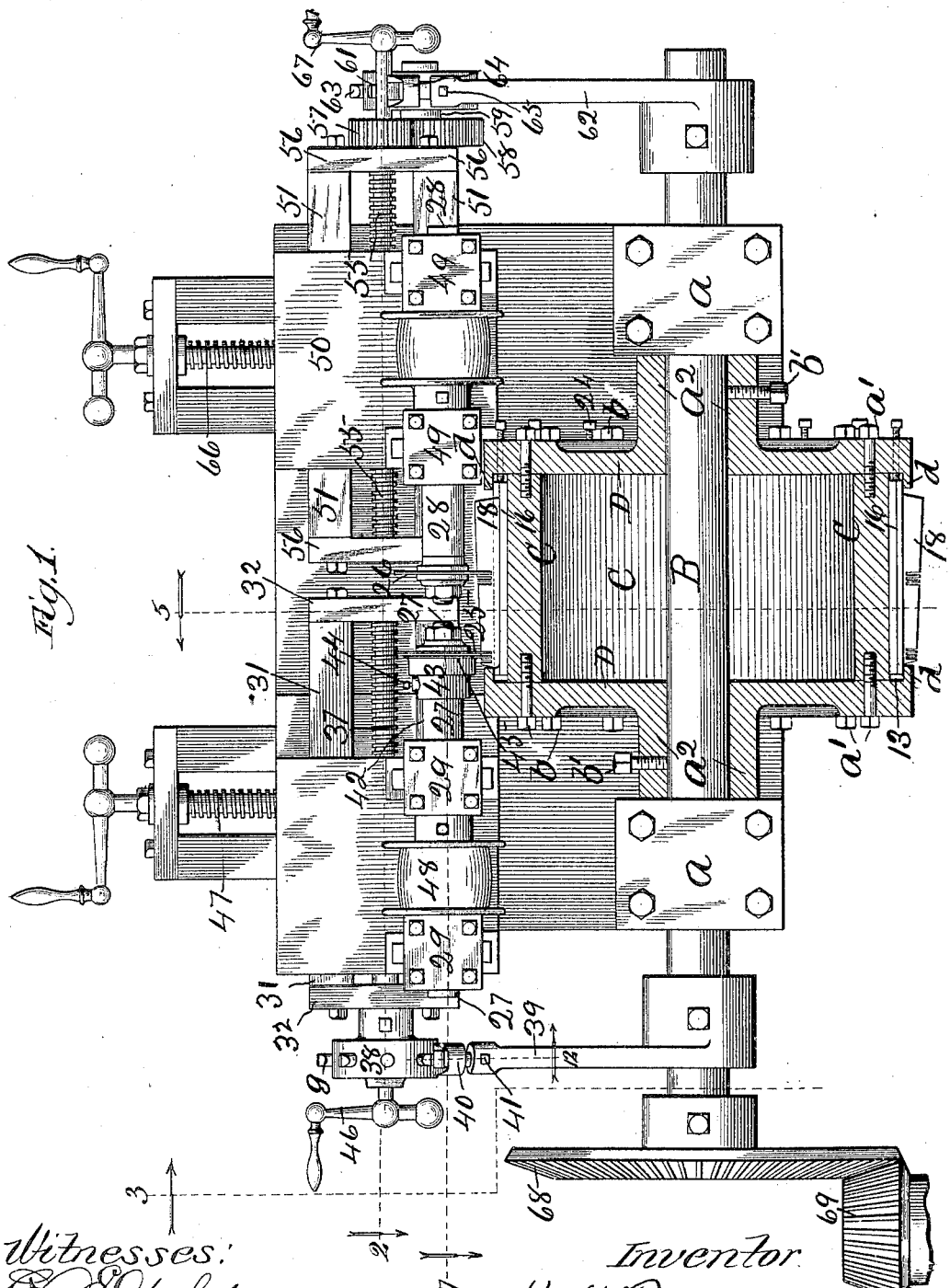

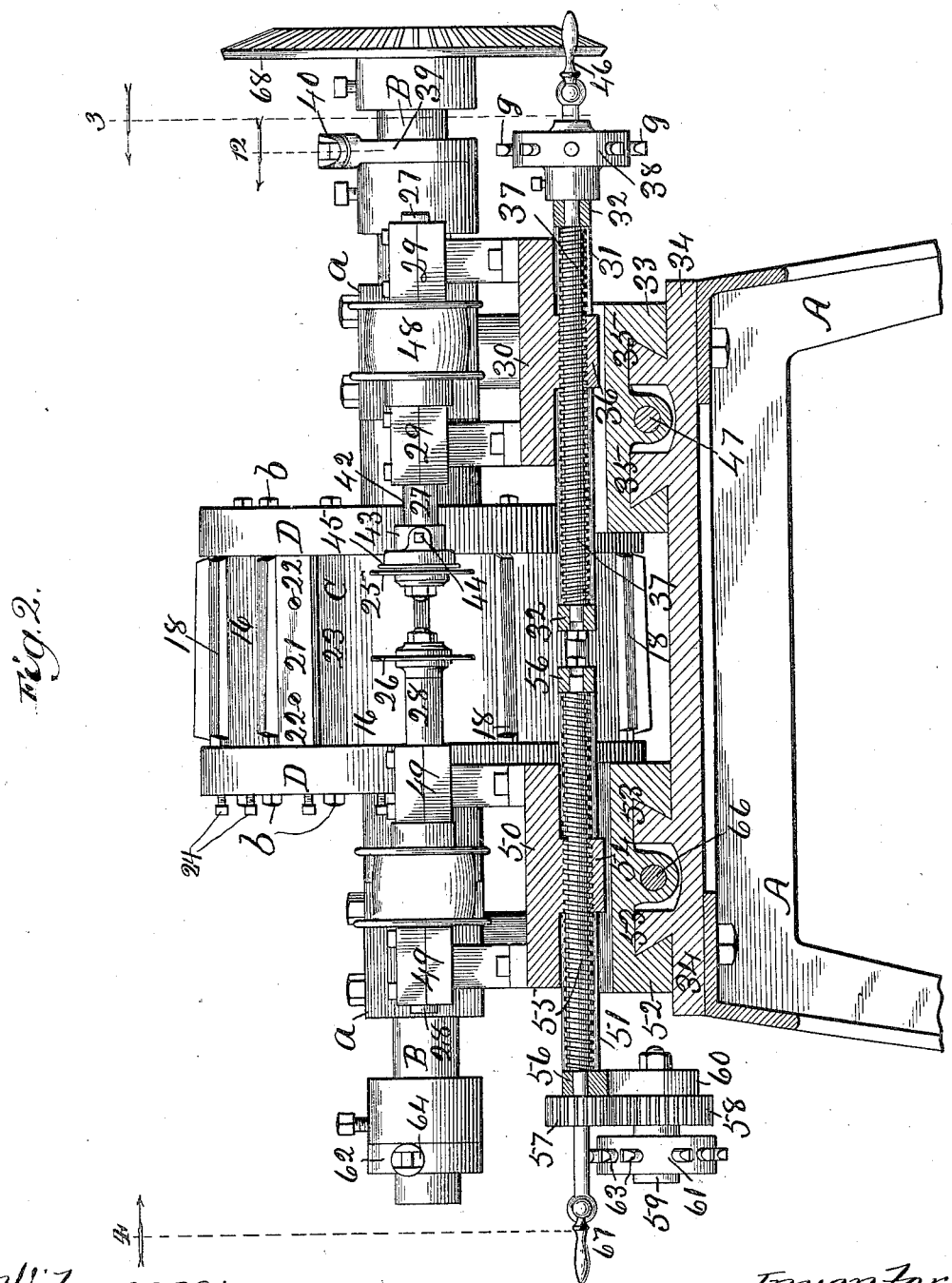

No. 649,875. Patented May 15, 1900.
H. H. PREDMORE.
COMB CUTTING MACHINE.
(Application filed Dec. 27, 1898.)
(No Model.) 5 Sheets—Sheet 4.
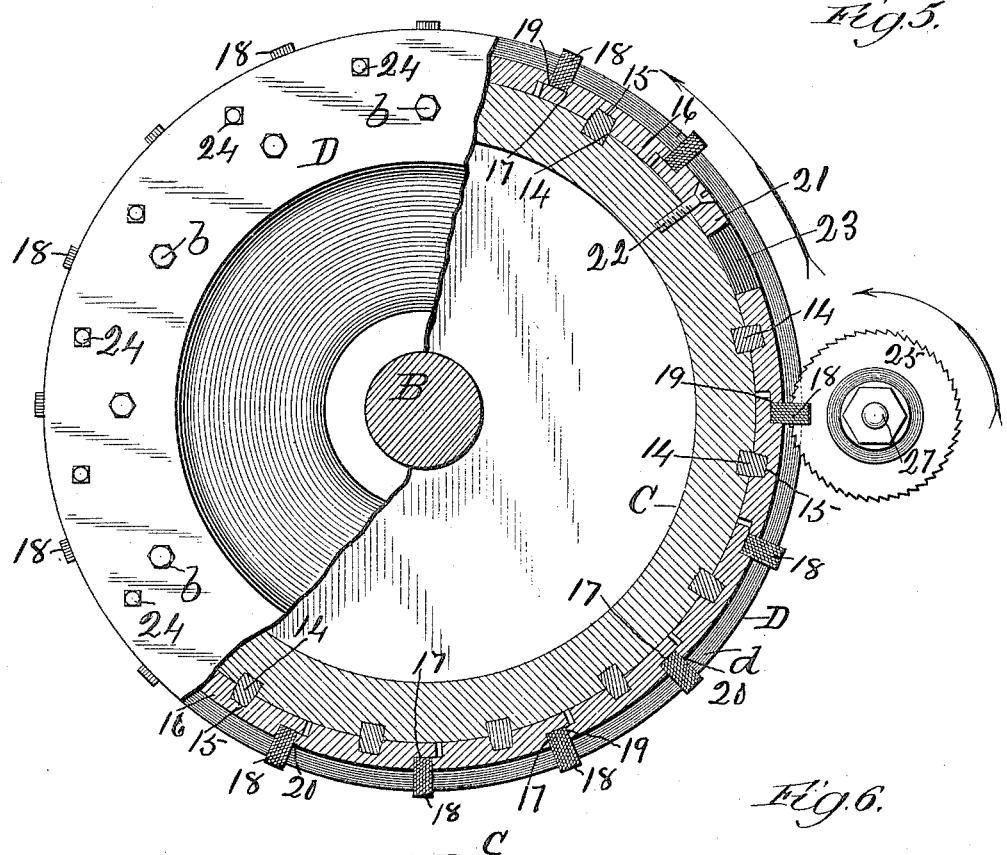
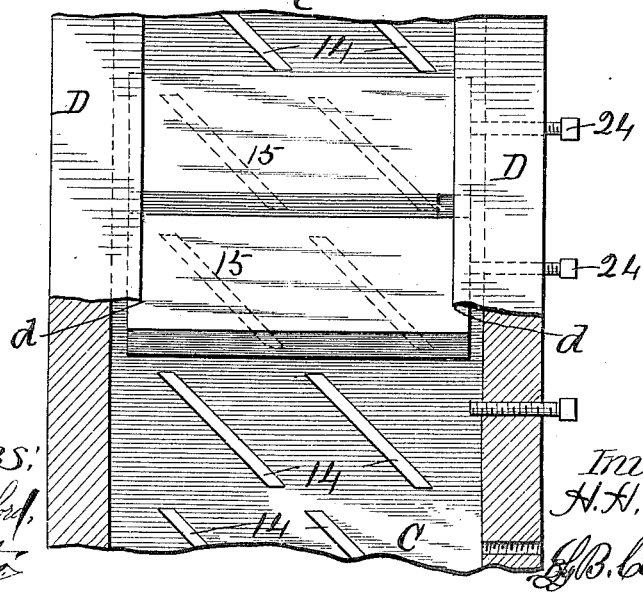
Witnesses: Inventor
H. H. Predmore No. 649,875. Patented May 15, 1900.
H. H. PREDMORE.
COMB CUTTING MACHINE.
(Application filed Dec. 27, 1898.)
(No Model.) 5 Sheets—Sheet 5.
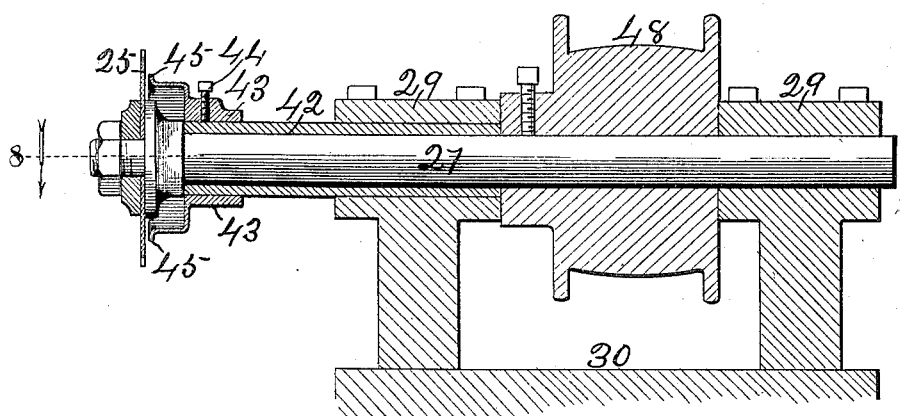
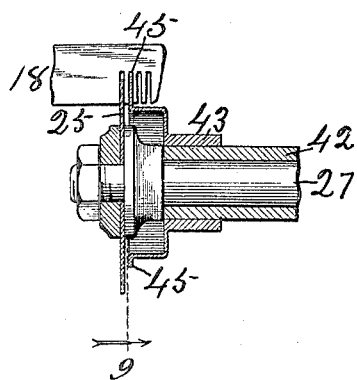
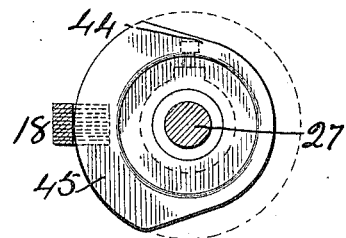
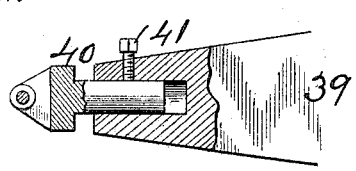
Witnesses:
Inventor
H. H. Predmore
By L. B. Coupland & Co
Attys.

UNITED STATES PATENT OFFICE.

HARVEY H. PREDMORE, OF CHICAGO, ILLINOIS, ASSIGNOR TO THE MANITOWOC ALUMINUM NOVELTY COMPANY, OF MANITOWOC, WISCONSIN.

COMB-CUTTING MACHINE.

SPECIFICATION forming part of Letters Patent No. 649,875, dated May 15, 1900.

Application filed December 27, 1898. Serial No. 700,443. (No model.)

*To all whom it may concern:*

Be it known that I, HARVEY H. PREDMORE, a citizen of the United States, residing at Chicago, in the county of Cook and State of Illinois, have invented certain new and useful Improvements in Comb-Cutting Machines; and I do hereby declare the following to be a full, clear, and exact description of the invention, such as will enable others skilled in the art to which it appertains to make and use the same.

The present invention has relation to that class of machines employed in the making of combs. The working of the machine is automatic, and it is adapted to cut the coarse and fine teeth at one operation, thus saving much time and greatly increasing the daily production.

Figure 1 is a horizontal plan section of a machine embodying the improved features. Fig. 2 is a broken-away elevation and part section on line 2, Fig. 1, looking in the direction indicated by the arrow. Fig. 3 is an end elevation and part section on line 3, Fig. 1, portions of the frame being broken away. Fig. 4 is an elevation of the opposite end with parts of the frame broken away. Fig. 5 is an end elevation and part section of a work-holding drum on line 5, Fig. 1, showing the arrangement of the comb-blank sections and the relative position of the cutting mechanism. Fig. 6 is a broken-away sectional detail of the work-holding drum. Fig. 7 is a longitudinal section on line 7, Fig. 1. Fig. 8 is a sectional detail on line 8, Fig. 7. Fig. 9 is a transverse section on line 9, Fig. 8. Fig. 10 shows a comb-blank; Fig. 11, the finished product; and Fig. 12 is a broken-away sectional detail on line 12, Figs. 1 and 2.

A represents the main supporting-frame, which may be of any desired form best adapted for the purpose. A driving or drum shaft B is provided with journal-bearings $a$ $a$ and has the work-holding drum C rigidly mounted thereon and rotating therewith in bringing the work into position to be operated upon by the cutting mechanism.

The work-holding drum is made up of three parts, C being the drum part proper, the open ends of which are closed by the companion disk plates D D, secured in place by the series of tap-bolts $b$. These disks or end plates are each provided with a hub extension $a^2$, fitting the drum-shaft, and are secured thereto by the set-screws $b'$. These disk or end plates are provided with overhanging edges or inwardly-projecting flanges $d$, Figs. 1 and 6, which provide an annular recess or space 13 between such overhanging edges and the adjacent surface of the drum.

The work-holding drum holds or carries the blanks $d'$ to be converted into combs and which are arranged at intervals in a series of sections, each section being composed of a number of blanks. This drum is provided on its periphery with a number of ribs 14, which are disposed at intervals and arranged in pairs. These ribs are set in a diagonal plane with reference to the axis of rotation and project outwardly from the surface of the drum and engage with the corresponding diagonal grooves 15, formed in the under side of the movable clamping-plates 16, as shown in Figs. 5 and 6. One edge of these plates is partially cut away from the outer side inwardly to provide a shoulder-bearing recess 17 for the seating of the series of comb-blank groups or work 18. The adjacent edges of the work-clamping plates are cut away from the inner side outwardly to form the offset 19 to permit of the edge part 20 not cut away to slightly overlap the adjacent surface of the next clamping-plate and bear against the comb-blank sections on that side in locking them in place for the operation of the cutting device. The series of clamping-plates extend around the periphery of the drum and are all movable or adjustable, excepting the stationary plate 21, Fig. 5, which is rigidly secured to the drum by screws 22. A break or space 23 is provided for between this stationary plate and the next movable plate of the series. The purpose of this break or space, Figs. 2 and 5, which extends clear across the surface of the drum, will be explained farther along.

The series of movable plates are forced into a clamping or locking position by means of the set-screws 24, which bear against one end thereof, and when turned inwardly impart a wedging action in clamping the work in place by reason of the engaging diagonal ribs and grooves.

The overhanging edges of the drum end plates prevent the movable clamping-plates from dropping out when the adjusting set-screws are turned back for the purpose of putting in or taking out the work.

The rotary cutters for operating on each end of the comb-blanks are supported on companion traveling carriages, which are made up of a number of parts, as will be hereinafter described.

The cutting devices proper consist of the two circular saws 25 and 26, mounted on the respective inner ends of the horizontal arbors 27 and 28. The arbor 27 is provided with journal-bearings 29, which are bolted to the movable bearing-block 30, resting on the companion guide-bars 31, having their respective ends joined by cross-bars 32, as shown in Figs. 1 and 2. The guide-bars 31 are stationary as to an endwise movement and are rigidly mounted on the base bearing-block 33, having a dovetailed engagement with the stationary bed-plate 34, as shown at 35, Fig. 2.

The movable or traveling bearing-block 30 is provided on the under side with a downwardly-projecting part, forming a screw-nut 36, engaging with the endless feed-screw 37, having suitable bearings in the end cross-bars 32. This feature provides for an endwise movement of the bearing-block 30 and with it the arbor 27, carrying the tooth-cutting saw, and bringing the same into position with reference to the work and cutting the comb tooth by tooth. The endless feed-screw 37 has a rotary but not an endwise movement.

A toothed feed-wheel 38 is mounted on the outer end of the feed-screw 37. A feed-arm 39 is mounted on the drum-shaft, its outer disengaged end being in line with the toothed feed-wheel, as shown in Fig. 1. On the outer socket end of this arm, Fig. 12, is adjustably inserted a feed-finger 40, which is adapted, once in each revolution of the work-holding drum, to come in contact with one of the teeth g of the feed-wheel and rotate the same a part of a revolution and pass on out of contact to engage the next tooth as the feed-arm comes around again, and so on in continuous succession. This intermittent movement is in turn transmitted to the feed-screw 37 and rotates it just far enough to impart an endwise movement to the cutting mechanism and bring the same into position to cut the next tooth. The feed-finger 40 is adjustably retained in the socket end of the feed-arm 39 by the set-screw 41 and provides a means for shortening or lengthening the feed-finger, so that the time of contact with its feed-wheel may be varied as the working conditions may require.

The position of the feed-arm and the intermediate mechanism actuated thereby will be so adjusted and timed that the intermittent endwise movement of the saw-arbor across the face of the work-holding drum takes place when the break or space 23 is coincident with the saw-arbor. This end of the machine is intended for cutting the fine teeth which have to be backed up or supported during the operation; otherwise they are liable to be bent out of shape or broken off. The means employed for this purpose will be next described.

A sleeve 42 is mounted on the arbor 27, which in turn has a sleeve 43 mounted on the outer end thereof, and is adjustable thereon with reference to the thickness of the teeth by a set-screw 44. A plate 45 is formed on the sleeve 43, Figs. 7, 8, and 9, and is adapted to fit into the space between the teeth and back of the tooth being cut and support the same, as shown in Fig. 8.

A crank 46, mounted on the outer end of the feed-screw, provides means for rotating the same by hand. By means of the hand-screw 47, inserted in the base bearing-block 33, the cutting mechanism may be moved away from or toward the word-holding drum.

48 is the driving-belt pulley mounted on the saw-arbor.

The coarse teeth of the combs are cut on the opposite end of the machine, nearly all the parts of which are duplicates of the end described.

The cutting-saw 26 is mounted on the arbor 28, which is provided with journal-bearings 49, bolted to the movable or traveling bearing-block 50, resting on the companion guide-bars 51. These guide-bars are stationary with reference to an endwise movement and are rigidly mounted on the base bearing-block 52, having a dovetailed engagement with the stationary bed-plate 34, as shown at 53, Fig. 2. The traveling bearing-block 50 is provided on the under side with a downwardly-projecting part, forming a screw-nut 54, engaging with the endless feed-screw 55, having its respective ends provided with suitable bearings in the cross-bars 56. By this arrangement the bearing-block 50 is adapted to have an endwise movement and carrying with it the arbor 28 and the cutting-saw mounted thereon. A pinion 57 is mounted on the outer end of the feed-screw 55 and engages with a second pinion 58, mounted on a stub-shaft 59, journaled in a hanger 60, suspended from the feed-screw 55. A toothed feed-wheel 61 is also mounted on the stub-shaft. A feed-arm 62 is mounted on the drum-shaft in line with the feed-wheel 61, the outer disengaged end of which is adapted to have contact with the teeth 63 of the feed-wheel once in each revolution and impart a single impulse thereto, which movement is in turn transmitted to the feed-screw and the endwise movement of the cutting mechanism effected. The outer socket end of this feed-arm is provided with a feed-finger 64, longitudinally adjustable by means of a locking set-screw 65. The construction, arrangement, and operation are precisely the same as the similar features and parts described in connection with the opposite end of the machine, there being, however, this difference. In the last-described end of the machine two pinions are used between the feed-wheel and feed-screw for the purpose of changing the feed as the speed is varied in cutting the fine and coarse teeth. The backing-plate, following the cutting-saw, is omitted in this end of the machine, as the coarse teeth do not require stay or support in the process of cutting.

A hand-screw 66 is inserted in the base-block 52 and provides means for moving the cutting mechanism up to or away from the work. The crank 67, mounted on the end of the feed-screw 55, permits of the same being rotated by hand in shifting the cutting mechanism.

The motive power is transmitted through the medium of the gear-wheel 68, mounted on the drum-shaft, and the pinion 69, engaging therewith.

In operation the companion feed-screws rotate in opposite directions in cutting the teeth in both ends of the comb simultaneously, but each cutting-saw working independently of the other, so that it is possible to work one end of the machine without the other when necessary. In Fig. 1 is illustrated the relative working position of the companion cutting-saws. The saw cutting the fine teeth is set to begin at the end and cut to the middle. The saw cutting the coarse teeth begins at the middle and cuts to the end—that is, the one saw advances while the other recedes. When the finished combs are taken out and the drum reloaded with blank sections, the cutting mechanism is returned to its normal or starting position by rotating the feed-screws by hand.

Having thus described my invention, what I claim as new, and desire to secure by Letters Patent, is—

1. In a comb-cutting machine, the combination with a rotatable shaft, supported in suitable bearings, of a work-holding drum, rigidly mounted thereon, and the companion carriages, carrying the cutting mechanism and traversing the face of said drum in the same direction, that is, one cutter advancing as the other recedes, whereby the fine and coarse teeth are cut simultaneously.

2. In a comb-cutting machine, the combination with a rotatable drum provided on its periphery with a number of ribs set in a diagonal plane with reference to the axis of motion, the work-clamping plates, provided on their under side with corresponding diagonal grooves engaging said ribs, and means for moving said plates into a locking position.

3. In a comb-cutting machine, the combination with the driving-shaft, of a work-holding drum, rigidly mounted thereon and consisting of the drum part proper and the companion disk end plates, provided with hub extensions fitting said shaft and having the inwardly-turned overhanging edges, the series of ribs, set diagonally in the periphery of said drum, the clamping-plates, provided with corresponding diagonal grooves engaging said ribs, and the means substantially as described for moving said plates into a locking position.

4. In a comb-cutting machine, the combination with the arbor 27, of the rotary cutter, carried thereby, a sleeve, mounted on said arbor, a second sleeve, having a plate formed thereon and adjustably mounted on the first sleeve, said plate being adapted to engage the back of the tooth being next cut.

In testimony whereof I affix my signature in presence of two witnesses.

HARVEY H. PREDMORE.

Witnesses:
L. M. FREEMAN,
L. B. COUPLAND.